Nov. 7, 1933.  W. F. GROENE  1,934,530
MACHINE TOOL
Filed Sept. 25, 1931   7 Sheets-Sheet 1

Fig. 1.

INVENTOR
William F. Groene
BY
ATTORNEY

Nov. 7, 1933.   W. F. GROENE   1,934,530
MACHINE TOOL
Filed Sept. 25, 1931   7 Sheets-Sheet 4

Fig. 4.

INVENTOR
William F. Groene.
BY
ATTORNEY

Fig. 5.

Nov. 7, 1933.  W. F. GROENE  1,934,530
MACHINE TOOL
Filed Sept. 25, 1931   7 Sheets-Sheet 6

INVENTOR
William F. Groene
BY
ATTORNEY

Patented Nov. 7, 1933

1,934,530

UNITED STATES PATENT OFFICE 1,934,530

MACHINE TOOL

William F. Groene, Cincinnati, Ohio, assignor to The R. K. Le Blond Machine Tool Company, Cincinnati, Ohio, a corporation of Delaware Application September 25, 1931
Serial No. 565,144

18 Claims. (Cl. 82—9)

My invention pertains to lathes for turning parts, particularly the crank pins, of a crank shaft for an internal combustion engine. Machines for the same purpose are disclosed and claimed in the patent to me and Harold J. Siekmann, No. 1,744,885, issued January 28, 1930, and my copending application, No. 407,814, filed November 18, 1929.

An object is to turn a number of crank shafts and their pins simultaneously. In the illustrated instance herewith, three crank shafts are shown as having their crank pins turned and the webs connecting the crank pins cheeked in one continuous turning operation by three sets of tools.

Another object is to feed the tool-carrying members toward and away from the work in a better manner while they track in the orbit of the crank pins.

A still further object is the provision of a better mounting of the upper master crank shaft, together with improved means for driving this upper master crank shaft from the power source.

Other novel features will be pointed out as the description of the mechanism proceeds.

Referring to the drawings:—

The base 1 of the machine has mounted thereon at respective ends the housings 2, the upper parts of which are tied together at their rear sides by the tie bar 3, and at the front by a member 4 which acts as a tie bar and also supports several elements of the mechanism as will be later described. The base 1, between the housings 2, is a trough with its front wall 1a downwardly and rearwardly sloped, and has near its front and at its rear, members 5 and 6, respectively, extending from end to end of the trough part; these members serving as supports for various operative parts of the machine, as will be later described.

Each housing 2, at the rear of its base, forms a bearing 7 with a cap 8; and a third bearing 7′ midway between the bearings 7, is bolted to the rear member 6 by bolts 9, and has a cap 7″; the three bearings being in alignment. The master crank shaft 10 turns in these bearings and has its throws or cranks of the same effective dimensions as those which the produced crank shafts are to have.

Carrier frames 11 and 12, close to the respective housings 2, have lower bearings on suitable journals formed on the master crank shaft 10, with caps 11′ and 12′, respectively. These frames incline forwardly and upwardly, and in their upper ends have bearings 13 for a second master crank shaft 14. A bracket 15 is fixed on and projects from the right end of the base 1, close to its bottom, and supports an electric motor 16, carrying fixed on its shaft a driving pinion 17. Above and slightly to the rear of the motor shaft is the machine driving shaft 18, journaled in bearings 19 in the bases of the two housings 2, adjacent to which, just in from the respective housings 2, transmission pinions 20 and 21 are fixed on this driving shaft 18, which projects beyond its bearing 19 at the right end, with a gear 22 fixed on it and meshing with the motor pinion 17.

The transmission pinions 20 and 21 mesh with respective gears 23 and 24 fixed on the adjacent parts of the master crank shaft 10. Similar gears 25 and 26 are fixed on the upper master crank shaft 14. Idler gears 27 and 28 are journaled on studs 27a and 28a held in the outer sides of the respective carrier frames 11 and 12; one intermediate gear 27 meshing with the lower and upper master crank shaft gears 23 and 25, and the other meshing with the lower and upper master crank shaft gears 24 and 26. Thus, the motor 16 driving the lower master crank shaft 10 by pinion 17 and gear 22, this drive is transmitted to the upper master crank shaft 14 at both ends of the machine by the train of gears 23, 27 and 25 at one end, and by the train of gears 24, 28 and 26 at the other end of the machine.

Figure 2:
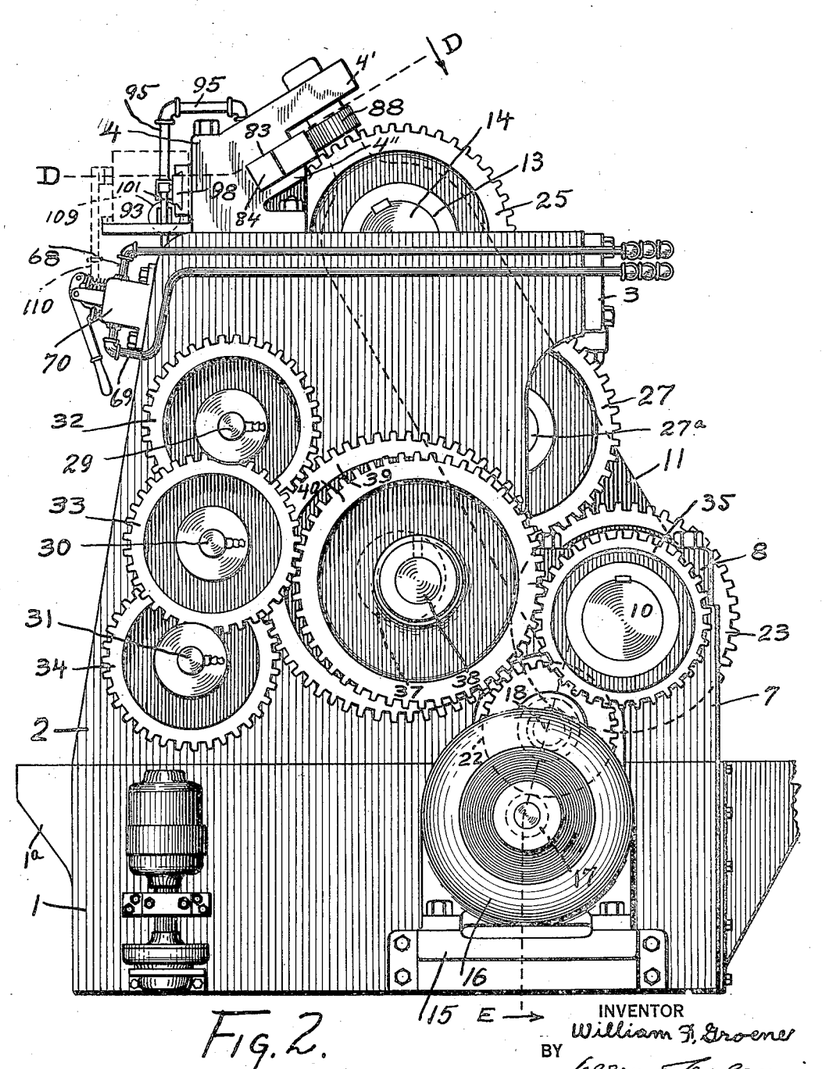
Fig. 2 is an end elevation showing the drives for the master shafts and the spindles of the lathe.

In the front part of each housing 2 (as best seen in Fig. 2) three spindles 29, 30 and 31 are journaled in a downwardly extending series, with outward extensions having fixed thereon respective spindle driving gears 32, 33 and 34; the middle gear 33 of the series being outward from and overlapping the other two gears 32 and 34. The lower master crank shaft 10 has extensions past its bearings 7 at both ends of the machine, on which are fixed wide faced gears 35 and 36. Between the wide faced gear, 35 or 36, at each end, a stud is fixed in and extends out from the housing 2, with a part 37 nearer the housing 2 and a reduced outer part 38 which is eccentric to the part 37. These parts 37 and 38 have journaled on them the larger idler gear 39 and the smaller idler gear 40, respectively. Both of these gears 39 and 40 mesh with the wide faced gear 35 or 36, as the case may be, and the larger idler gear 39 meshes with the top and bottom spindle gears 32 and 34, while the smaller gear 40 meshes with the middle spindle gear 33. The spindles 29, 30 and 31 also have extensions inside their bearings in the housings 2, and have fixed thereon respective chucks such as are disclosed in my co-pending application, Ser. No. 297,881, filed August 6, 1928, and which later will be more fully described. It will be understood, however, that other suitable chucks may be used instead of these particular chucks of my invention. It will be seen that, although the two idler gears 39 and 40 at each end are of different diameters and mounted eccentrically to each other for simplicity of construction and arrangement, they drive the three spindles 29, 30 and 31, and the chucks thereon, in synchronism with the master crank shafts 10 and 14, which also are synchronized through the idler gears 27 and 28 as before described.

Each tool frame 42 comprises a broad flat middle or main portion with a rear bearing arm 43 extending down and rearward from its rear part and an upper bearing arm 44 extending up from the rear of its top. The rear arm 43 has a bearing, with a cap 43a, embracing a respective crank pin 10a of the lower master crank shaft 14; and the upper arm carries a bearing pin 44a connecting it to the rear end of a link 45 extending forward and down and having at its forward end a bearing, with a cap 45a, embracing a respective crank pin 14a of the upper master crank shaft 14. On each side of its main part, each tool frame 42 has fixed, near its front edge and near its rear edge, respectively, hardened steel bearing plates 46 and 47; the plates 46 and 47 of each frame 42 bearing against the corresponding plates 46 and 47, respectively, of the adjacent tool frame 42 in the series, whereby the frames 42 may bear closely and accurately together with a minimum of friction and wear.

On the front edge of each tool frame 42 are fixed a series of tool blocks 48, each carrying cutting tools 49 to operate on a respective crank pin of a crank shaft held in the chucks of the spindles 29, 30 and 31, before described. Each tool frame 42 has a series of forwardly and downwardly inclined passages 50 in it from rear to front, communicating at the rear with a manifold 50a on the rear edge of the tool frame, and having respective spouts of nozzles 50b extending close to the respective tools 49. Supply tanks 51 are mounted on the tops of the respective housings 2, with flexible conduits 51a leading from their bottoms to the tops of the manifolds 50a of the several tool frames; one such arrangement being clearly shown in Fig. 3. The tanks 51 thus supply coolant to the tools 49.

Figure 6:
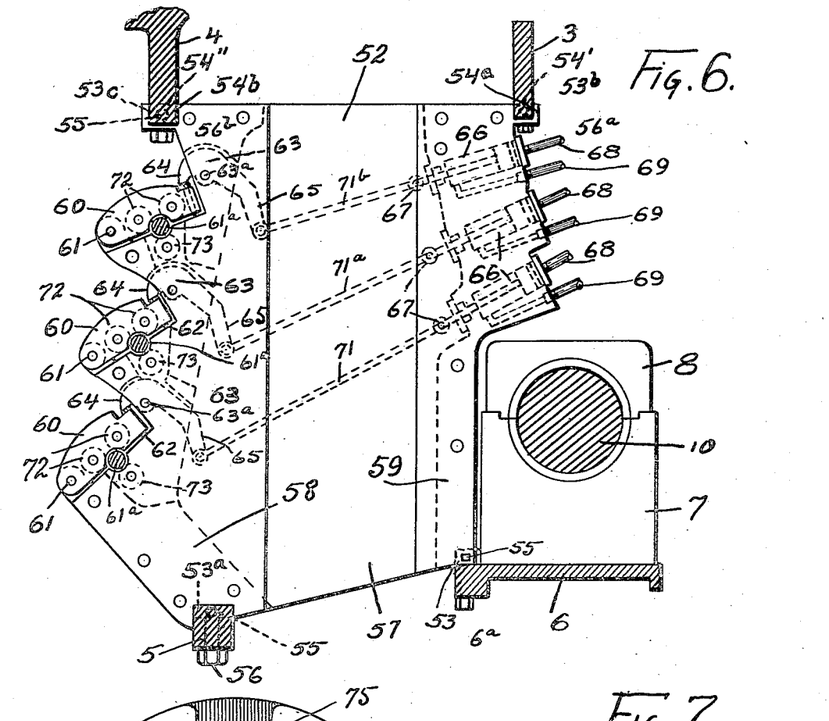
Fig. 6 is an elevation, partly in vertical transverse section on line C—C of Fig. 1, of the steady rest member.
Figure 7:
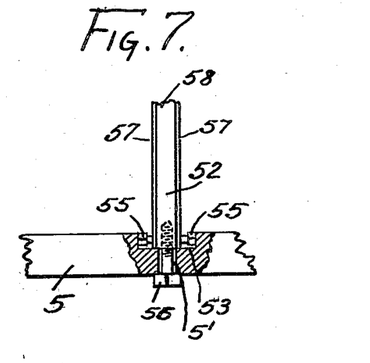
Fig. 7 is a detail of an adjustable steady rest support.

Midway of the length of the working space between the two housings 2, the steady rest frame 52 (Figs. 1, 6 and 7) is supported at four corners of the front base member 5, rear base member 6, rear upper tie bar 3 and front upper tie bar 4. The rear base member 6 and the bars 5, 3 and 4 have notches 53, 53a, 53b and 53c to receive the steady rest frame 52. These notches are wider than is this frame, which has its upper corners that enter the notches 53b and 53c in the form of horizontally extended lugs 54a and 54b. In each one of the three notches, adjusting screws 55 extend horizontally from both sides of the frame with their heads bearing against the adjacent ends of the respective notch, and a bolt 56 extends up through a slot 5' in the lower front bar 5 and is threaded into the frame 52; while bolts 56a and 56b extend up through slots 54' and 54" in the frame lugs 54a and 54b and are threaded into the upper tie bars 3 and 4, respectively. These adjustable fastenings permit the steady rest frame to be accurately adjusted in the machine, relatively to the spindles and chucks, so that the steady rest devices carried thereby will not bind when applied to the middle journal bearings of the crank shafts being machined while held in the chucks on the spindles 29, 30 and 31 as before described; and also into the required close contact with the tool frame plates 46 and 47.

The steady rest frame is made up of two side plates 57 with filler members 58 and 59 fixed between them at the front and rear, respectively. Clamp members 60, one for each shaft to be machined, have at their outer ends hinge connections 61 to forwardly and upwardly directed ears on the front filler member 58. The inner end part of each clamp member 60 has an adjustable stop screw 62 down through it, to engage with the upper surface of the downwardly and forwardly inclined step or extension of the front filler member 58, to limit the downward clamping movement of the clamp member 60. Adjacent to each one of these steps the filler member 58 has a front to rear slot containing a respective lock hook 63 pivoted near its forward upper end on a pin 63a extending transversely through the member 58. The upper end of this lock hook 63 has a radial lower surface extension 64 to engage over the flat head of the stop screw 62 of the respective clamp member 60 as the upper end of the lock hook 63 swings forward on the pivot 63a, and thus hold the clamp member 60 firmly closed with the stop screw 62 limiting the closure as above described. The other end part of the lock hook 63 is a rearwardly and downwardly curved arm 65. Mounted on the rear edge of the rear filler member 59 are a series of fluid pressure cylinders 66, each with a piston and a piston rod 67, and with pipes 68 and 69 leading, respectively, from in front of and in back of their pistons to control valves 70 on the upper front part of the right hand housing 2. Rods 71, 71a and 71b, of appropriate different lengths, connect each piston rod 67 to the end of a respective lock hook rear arm 65. Thus, if a piston moves forwardly, a lock hook 65 raises its forwardly extended upper part 64 and releases the respective clamp member 60; the movement being sufficient to allow the clamp member then to be opened manually. After the clamp member 60 has been closed manually, a movement of the respective piston backward swings the lock hook part 64 down clampingly on the clamp member, with the force of the fluid pressure in the cylinder 66, which may be either liquid or pneumatic pressure, as will readily be understood in the art. Each clamp member 60 has a downwardly opening slot lengthwise of its lower side, containing a pair of rollers 72; and the extension of the front filler member 58 has a similar slot opening upwardly, containing a single roller 73; these rollers 72 and 73 being so arranged that when the clamp is closed they bear on the work substantially at equal intervals therearound and hold the crank shaft A, midway of its length, concentric with its end supports in the chucks.

Figure 1:
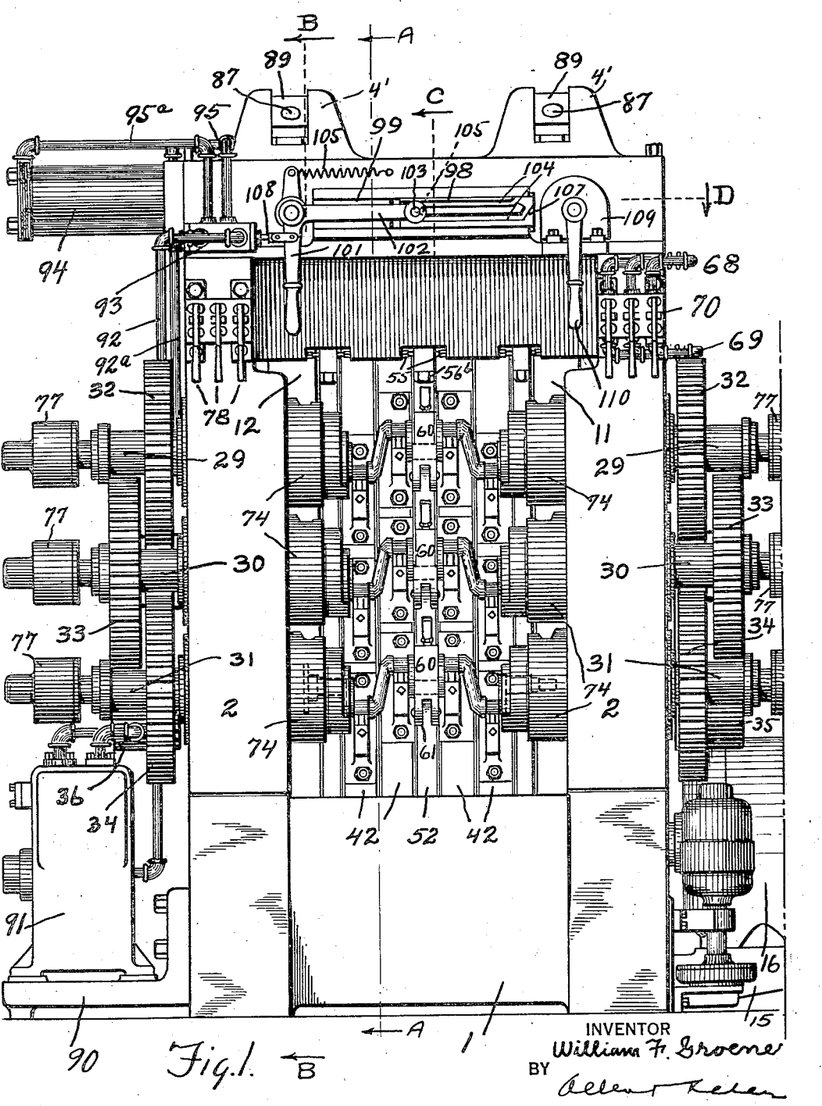
Figure 1 is a front elevation of a crank shaft lathe typifying my invention.
Figure 8:
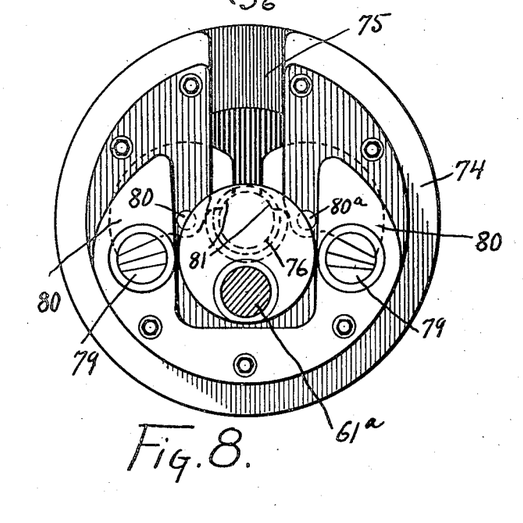
Fig. 8 is a face elevation of the typical chuck shown in the other views.

The construction and operation of one of the chucks, the subject matter of my copending application as before mentioned, may be understood from a brief description, referring to Fig. 8 of the drawings. The barrel 74 has an opening 75 from its central part out through its periphery to admit the work to rest on the centering bearings 76 in the outer end of the chuck. The chucks are operated by fluid pressure, either pneumatic or hydraulic, by means of cylinders 77 on outward extensions of the chuck spindles 29, 30 and 31, as best seen in Fig. 1, under the control of valves 78 on the upper front part of the left hand housing 2. Although not shown in detail, since not essential parts of my present invention, it will be understood that each cylinder has a plunger with a rod extending into the respective chuck to operate wedges 79, shown in Fig. 8, which act on jaws 80 pivoted on pins 80a, raising the radially outer ends of the jaws and depressing their inner ends 81 onto the work, in the positions shown in Fig. 8, thus holding the respective end of the crank shaft rigidly during the turning operation.

The details now to be described are comprised in the feeding mechanism. The front upper tie bar 4, adjacent to the gear carrier frames 11 and 12, has respective enlargements, each comprising two rearwardly and upwardly extending arms 4' and 4'', the shorter one 4'' below the other one 4' forming a guideway 83 of the same direction. Sliding crosswise in these guideways 83, and longitudinally of the machine are cam bars 84, connected together by a rod 85, which is threaded in its connection to the respective cam bars at the opposite ends of the machine, with lock nuts 85a. This is preferred, rather than having both cam bars 84 of one piece, as the just described connections allow relative adjustment of the cam bars to each other longitudinally, for accurate synchronization of the cam mechanisms at the two ends of the machine.

The upper guideway forming arm 4' has lengthwise of it a slot 86 opening out through its rear end; and each carrier frame 11 or 12 has a journal post 87 extending up into the slot 86 of adjacent arm 4'. Below this arm 4' a roller 88 is journaled on this post 87 and bears forwardly against the rear face of the respective cam bar 84; and above this roller 88 the post 86 fits in a block 89 snugly slidable in the arm slot 86, assuring against deflection of the carrier frames 11 and 12 lengthwise of the machine.

A bracket 90 extends from the left end of the base 1 (Fig. 1) and supports a variable displacement pump 91 of standard commercial type such as that supplied by the Oilgear Company. Pipes 92 and 92a connect this pump 91 with a control valve 93, which may be of any commercial type. A power cylinder 94 extends horizontally from the upper left side of the left housing 2 and has its opposite ends connected to the control valve 93 by pipes 95 and 95a; it being understood that this control valve 93 may be of any commercial type which will admit fluid under pressure from the pump 91 to either end of the cylinder 94. This cylinder, understood to have a plunger to which its rod 96 (Fig. 9) is connected, has this rod 96 connected to the adjacent one of the cam members 84, so that admission of the fluid first to one end and then to the other, of the cylinder 94, reciprocates the two cam members 84, connected by the rod 85, lengthwise of the machine. Each cam bar 84 has, to contact with the rollers 88, two rear surfaces 96 and 97 of different inclination to the direction of the above travel of the cam members; the more inclined surface 96 contacting the roller 88, giving a faster feed, and the less inclined surface 97 contacting with the roller 88, giving a slower feed.

A control cam plate 98 slides horizontally, endwise of the machine, in a guide 99 mounted on the front of the upper front tie bar 4, and is connected to the tie rod 85 of the cam members 84 by a rearwardly projected arm 100, which is adjustably clamped to the tie rod 85 by a set screw 100'; so that the control cam plate 98 slides along with the cam members 84. The valve control lever 101 is fulcrumed near the left end of the guide 99 and has an arm 102 with a pin 103 on its end, extending back into and bearing in a system of grooves 104 in the front face of the cam plate 98. The lever 101 has a second shorter arm extending upward with its end connected to an extension spring 105 which is stretched from this arm to a fastening in the front face of the tie bar 4. The grooves 104 are continuous around an inner projection, and the passage from the lower groove to the upper groove at the right end of the cam plate 98 comprises a right hand upward incline 107, succeeded by a left hand upward incline and then a left hand downward incline into the upper groove. At the left end of the system of grooves there is simply a rounded end on the inner projection, around which the lever arm pin 103 may pass under the force of the spring 105. The main part of the lever 101, which extends down from its fulcrum and has a handle on its end, is connected by a link 108 a short distance down from its fulcrum, to the stem of the control valve 93, before described as controlling the tool feed cylinder 94. Mounted on the face of the right hand end part of the tie bar 4 is the switch 109 which, connected with the motor 16 by conductors not shown, will be understood to be capable of starting and stopping the motor when manually operated by means of its handle lever 110 depending therefrom.

Figure 3:
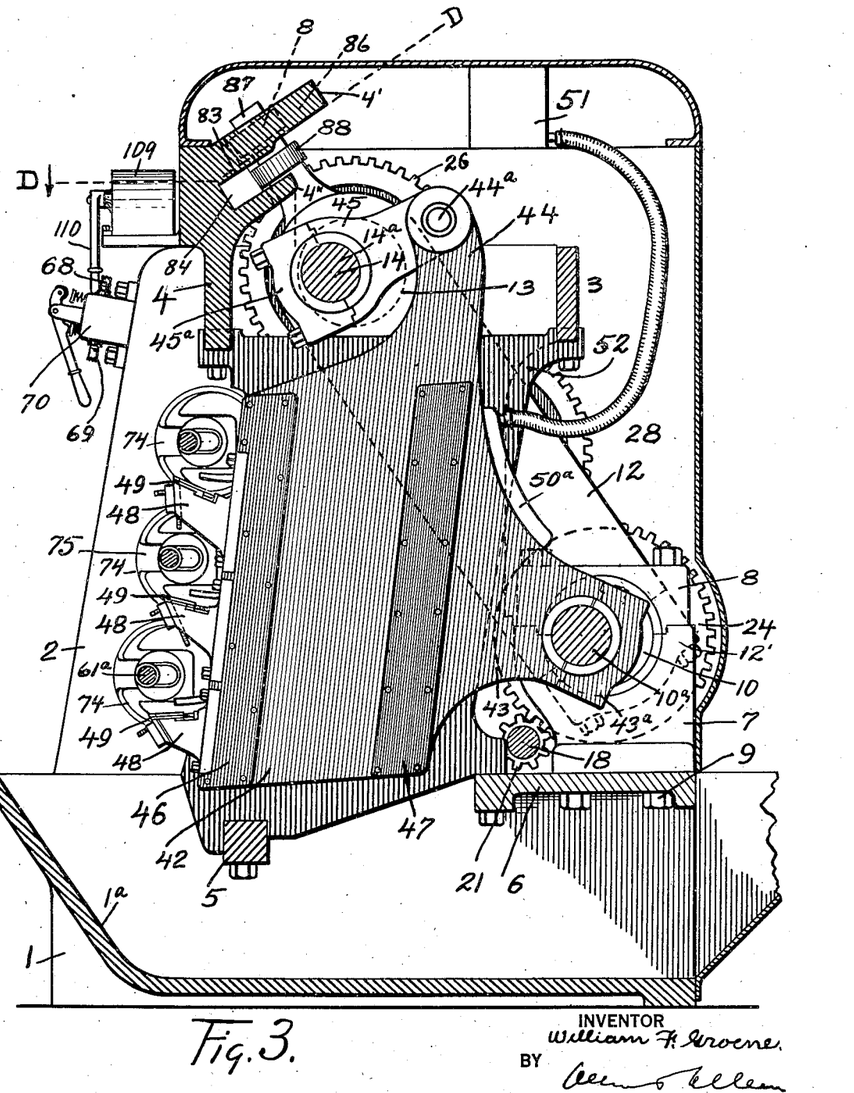
Fig. 3 is a vertical transverse section on line A—A of Fig. 1, showing one of the tool carrying frames with its tools in starting position.
Figure 4:
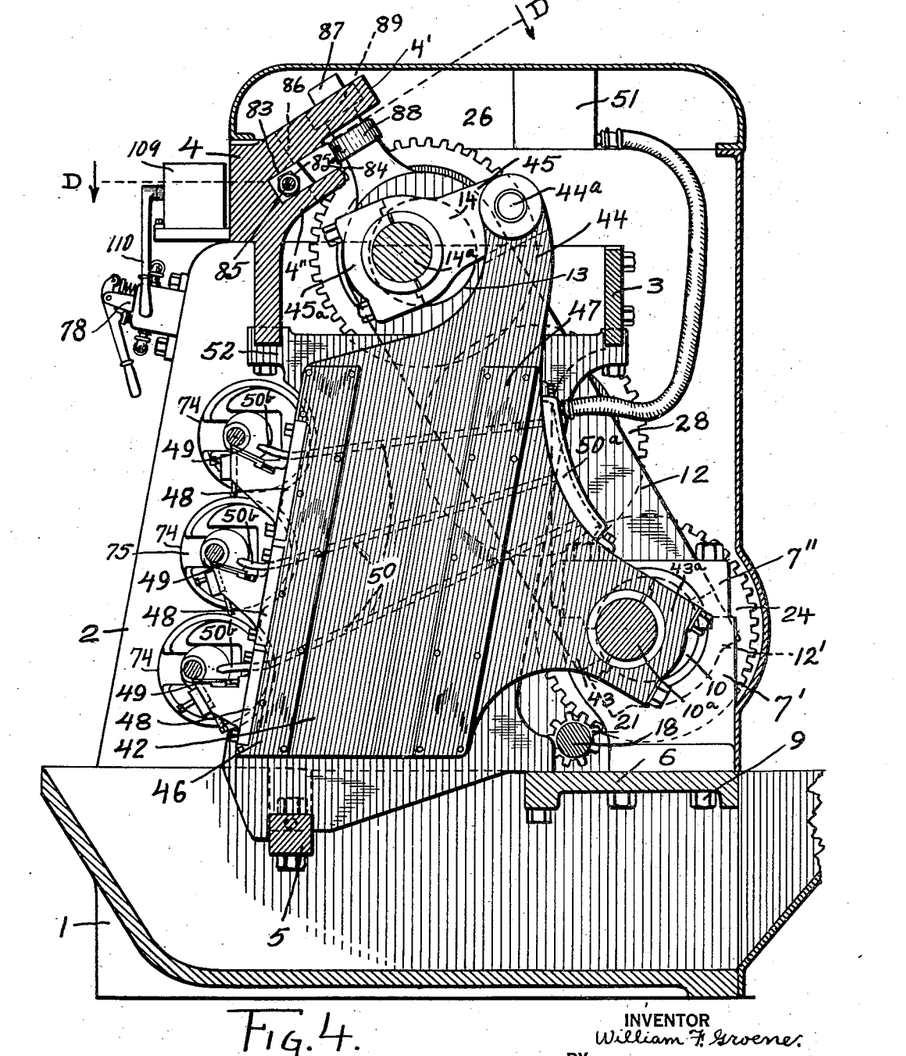
Fig. 4 is a vertical transverse section on line A—A of Fig. 1, showing one of the tool carrying frames with its tools in finishing position.
Figure 5:
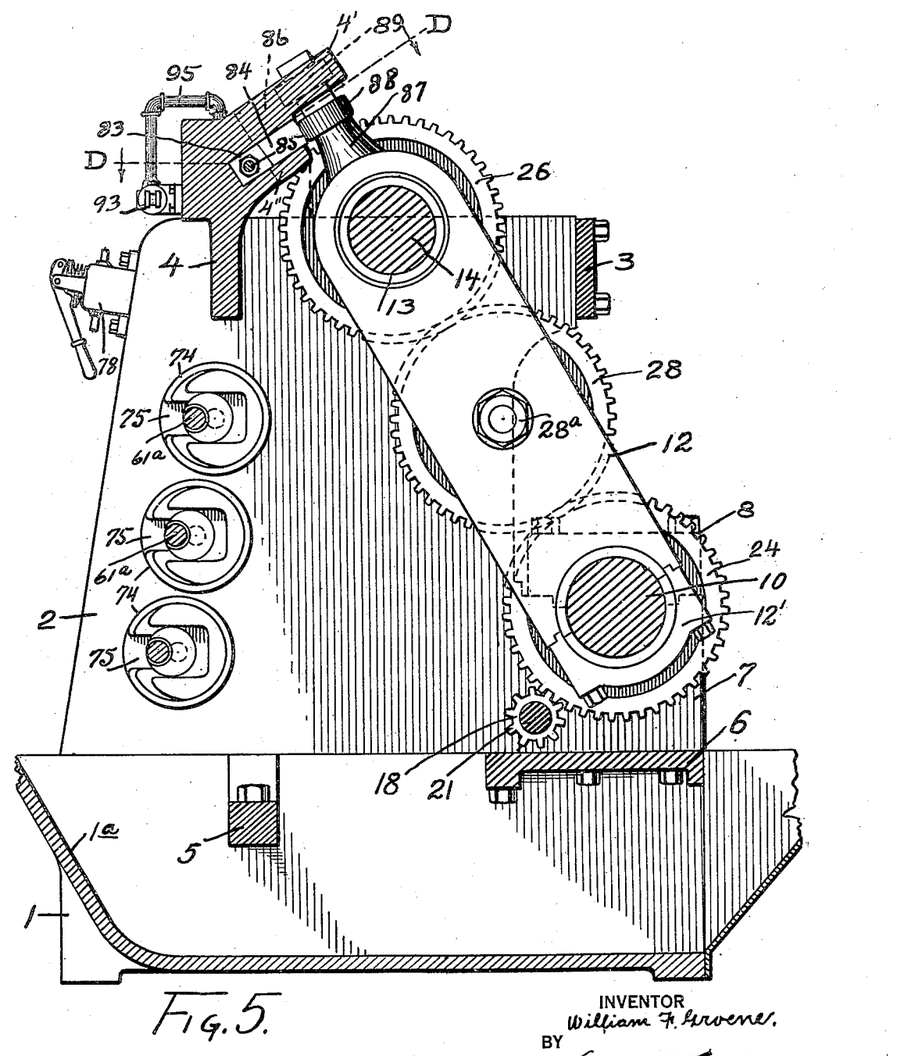
Fig. 5 is a vertical transverse section on line B—B, Fig. 1, showing one of the upper master crank supporting and feeding members.

As was before described, each tool frame 42 has bearings on corresponding crank pins of the two master shafts 10 and 14, below and above, respectively. Consequently, each such frame 42 will have, bodily, a circular motion so that its tools 49 will follow the circular motion of the respective crank shaft crank pins being finished, not considering any modification of this motion for feeding the tools to the work. Also, as may be understood from Fig. 1, the tool frames 42 are spaced around their circle of rotation as are the master crank pins they are mounted upon. In the example, crank shafts each with four crank pins are being finished, the pins 180 degrees apart, so that, as illustrated in Fig. 1, when two pins are down the other two are up; and the four tool frames 42 are correspondingly down and up. In Figs. 3 and 4 only one tool frame 42 is shown, to avoid complexity of the drawing that would result from an attempt to show by dotted lines an adjacent tool frame with its tool 180 degrees displaced from the one shown; but in these views there is the difference from Fig. 1 that the tool frame 42 shown, together with its supporting master crank pins 10 and 14 and the crank pins of the shafts being machined, is at forwardmost position, i. e., 90 degrees from the position illustrated for any of these parts in Fig. 1, and it will be understood that if an adjacent tool frame 42 were shown, in dotted lines as above discussed, it would be displaced rearward, or as the view is drawn, to the right. This is the position of the shafts in the chuck in Fig. 5 also; and it may be stated that the chucks are shown in Fig. 5 only conventionally, without the detail of Fig. 8. The above explanations concern the provisions for rotating the shafts relatively to the tools 49, i. e., the cutting, as distinguished from the feeding, operation.

The positions and movements of the carrying frames 11 and 12 concern the feeding operation and are different from, yet are combined with and modify the cutting positions and movements derived from the carrying of the tool frames 42 and tools 49 on the master crank pins. Figs. 3 and 4 best permit of a clear understanding of the carrying frame feeding movements; Fig. 3 illustrating the initial position of a carrying frame 12 and the consequent position of a tool frame 42 and its tools 49, at the end of the cycle and ready for beginning another cycle of operation, upon removal of the finished shafts from the chucks and steady rest. The cam member 84 is receiving on its lowest part 96 (Fig. 9), the roller 88 of the carrier frame 12 and the latter thus is swung to its forwardmost position, with the tools 49 carried by the tool frame 42 swung farthest forward and downward from the work because the carrier frame 12 has swung the upper master crank shaft as a whole forward and downward with it as it is permitted to do by the cam member low part 96.

Figure 9:
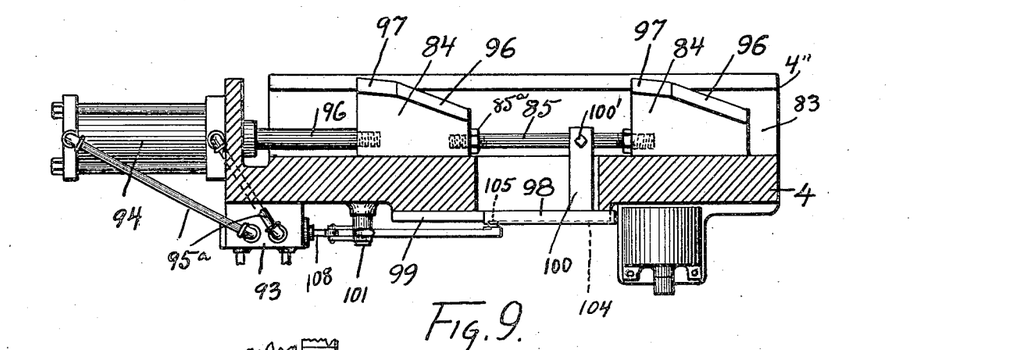
Fig. 9 is a plan, partly in longitudinal section on line D—D of Figs. 1-5, of the feed cams and their hydraulic control units.
Figure 10:
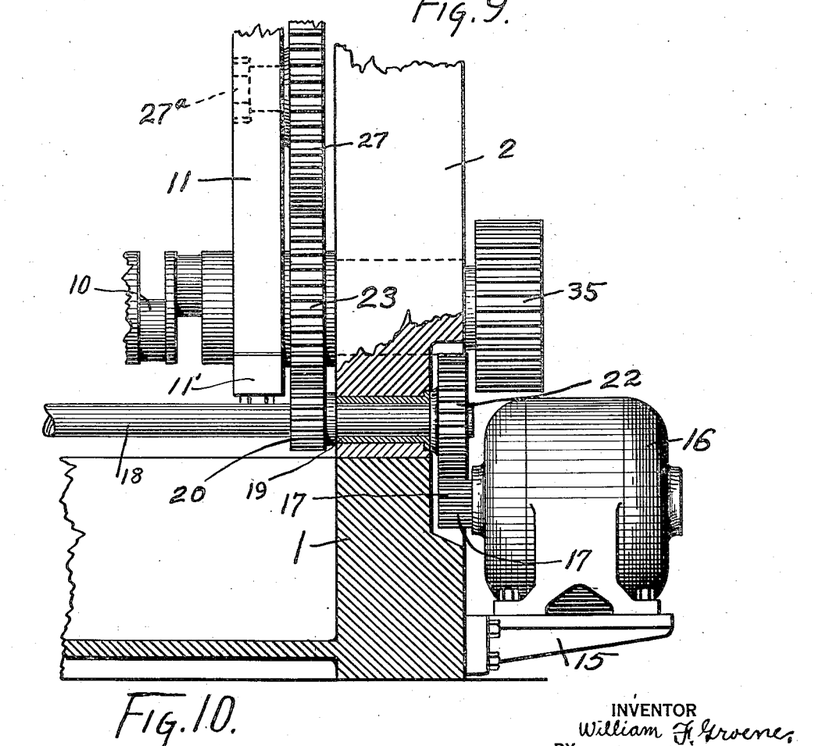
Fig. 10 is a vertical longitudinal sectional elevation on line E—E of Fig. 2, showing the motor and the driving means for the master shafts and spindles.

As will be seen readily in Fig. 9, if the cam member 84 moves to the right it gradually raises and pushes backward the carrier frame 12 by the rise of the part 96 against the carrier frame roller 88, carrying with it the tool frame 42 to raise its tools 49 up and back to the work; these first cutting the cheeks of the shaft webs to the desired finish and then cutting the crank pins, while the less sharply inclined part 97 of the cam member is advancing against the carrier frame roller 88. The completion of this is seen in Fig. 4, where the tools 49 are seen against the respective pins of the cranks being machined. To bring the parts again to the positions of Fig. 3, the cam member 84 will have to return to its most extreme left hand position. A purpose of my invention is to cause this return of the cam members 84, with consequent return of the other parts, rapidly compared with the feeding movements just described.

In the accomplishment of this, I utilize the movement of the cam members 84 and their tie rod 85 to effect the automatic return through proper action on the pump 91 by means of the cam plate 98, connected to the rod 85, operating the control valve 93 of the pump 91.

I have shown my invention as requiring manual operation of the motor starting switch 107; but it will be understood that the operating lever 110 of this switch may have such connections in such relation to the cam plate 98 or to the valve control lever arm 102 that this switch will be caused to open the motor circuit as the incline 107 reaches the pin 103, thus stopping the rotating parts of the machine and the cam shaft when the feed is stopped.

Fig. 1 illustrates the parts concerned in this action, in their positions they would have upon the instant of completion of a crank shaft as shown in Fig. 4 and as above described. The lever 101 is permitted to swing by its pin 103 descending from the upper groove of plate 98 past the left end of the cam plate projection that defines its two grooves, this descent being caused automatically by the spring 105 as the cam members, at the completion of their right hand tool-feeding travel, have moved the cam plate 98 to this position.

This swing of the lever 101 reverses the valve 93, admitting the fluid pressure to the opposite side of the piston of the cylinder 94 in large volume, which rapidly traverses the cam members 84 to their initial position of Fig. 3, in which position they are stopped by the pin 103 riding up the incline 107 into the opposite upper end of the cam plate 98 which has been slid to the left with the cam members 84. This action of the cam incline 107 on the pin 103 raising the arm 102 of the control lever 101 causes this lever to set the control valve 93 at neutral, so that the piston of the cylinder 94 is under balanced pressure holding the cam members 84 at this returned initial position of Fig. 3. As the cam members 84 move to this initial position the carrier frame rollers 88 ride downward and forward successively on the cam member parts 97 and 96; and the carrier frame 12, with the tool carrier 42 and tools 49, by gravity, return forward, retracting the tools 49 downward and forward away from the finished shafts, leaving the shafts accessible for removal from the chucks and steady rest. The switch 109 is now operated by means of its handle 110 to stop the motor 16.

The control valves 70 now are operated to cause the pistons of the cylinders 66 to release and open the lock hooks 65 of the steady rest device, and the control valves 78 are operated to cause the plungers of the cylinders 77 to open the chuck jaws 80, permitting the finished shafts to be lifted out and the next three rough shafts to be placed in the chucks and steady rest. Then the valves 70 and 77 are operated to close the chuck jaws 80 and the steady rest lock hooks 65 by means of the pistons of the cylinders 77 and 66, respectively; thus setting these three shafts rigidly for machining. The operator then starts the motor 16 again, by means of switch 109, which starts rotation of the chucks and the tool frames 42 but does not affect the cam members 84 to swing the carrier frames 11 and 12 for feeding the tools 49. This is started by the operator, working the lever 101, raising the pin 103 from the top of the incline 107 at the right hand end of the cam plate 98, down against which the pin has been held by the action of the spring 105, until the pin is above the upturned right hand end of the projection defining the upper and lower portions of the slot system 104, which results in the lever 101 acting through link 108 to set the valve 93 off of its neutral position in which it has held the feeding device stationary, into position for admitting fluid to the left side of the piston of the cylinder 94 again, starting the cam members 84 to the right, with the pin 103 again riding in the upper portion of the slot system 104, to pass down to the lower portion at the end of feeding, reversing travel of the cam members 84, to stop the travel as the incline 107 again raises the pin 103, completing another cycle.

All work setting, machine starting and feed starting thus is under the control of the operator by means of the valves 70 and 77, the switch 109, and the valve 93; this latter valve having an automatic operation for return of the tools at the end of the cutting operations. These control devices are grouped together at the top of the front of the machine, within ready access of the operator while he is in position for placing the work in the chucks and steady rest devices.

An advantage which I consider important is derived from the linking of the tops of the tool frames 42 to the pins 14a of the upper master crank shaft 14 by the members 45, so that these frames 42 are given their circular motions on the upper master shaft pins and on the pins 10 of the lower master crank shaft 10 with the same precision as if the upper connections of these frames 42 to the upper pins 14a were not articulated but the same as their connections to the lower pins 10a. This upper linking compensates for the tendency of the tool frames 42 to expand or contract under working conditions, avoiding binding, friction and undue wear, with attendant inaccuracy of operation, of these frames and the tools 49 carried thereby.

A preferred example of my invention is described herein rather specifically, as is required, but it will be understood that various modifications may arise in practice, within the scope of my invention, and that I am not limited to such precise disclosure, but what I claim as new and desire to secure by Letters Patent, is:

1. In a machine tool for machining a surface on a work piece rotated on an axis to which said surface is eccentric, a master member with an axis of rotation and a surface having an eccentricity to its axis corresponding with that of the work piece surface to the work piece axis, means for causing synchronous rotation of the work piece and the master member on their axes, a tool, means whereby the eccentric surface of the master member carries the tool in an eccentric path corresponding to the eccentric path of said surface of the rotating work piece, and means for moving the eccentrically moving tool toward and from the eccentrically moving surface of the work piece, comprising a motive device causing the tool movement, a control device starting, stopping and reversing the motive device, operating means for the control device, and means movable in unison with the tool and actuating said control device operating means.

2. In a machine tool for machining a surface on a work piece rotated on an axis to which said surface is eccentric, master members each with an axis of rotation and a surface having an eccentricity to its axis corresponding with that of the work piece surface to the work piece axis, a tool, a member carrying the tool and movable with the eccentric surfaces of the master members, thereby carrying the tool in an eccentric path corresponding to the eccentric path of said surface of the rotating work piece, a master member carrier pivoted axially on one of the master members and carrying the other master member to rotate on its axis, means causing synchronous rotation of the work piece and the master members on their axes, and means moving the master member carrier to move the eccentrically moving tool toward and from the eccentrically moving surface of the work piece, comprising a slidable cam member operatively related to said master member carrier, fluid pressure motive means to move said cam member, controlling means for said motive means, and means whereby movement of said cam member operates said controlling means.

3. In a machine tool, means for movably supporting the work to be machined, tool supporting mechanism for moving said tool toward and from the work, means for operating said tool supporting mechanism comprising a cam member operatively related to said mechanism, motive means for moving said cam member, controlling means for said motive means, operating means for said controlling means, and means moving with said cam member in operative relation to said operating means, whereby the movement of said cam member is reversed and afterward is stopped.

4. In a machine tool comprising means for rotating a work piece, a tool, a mechanism for moving said tool toward and from said work piece, means for operating said mechanism comprising a slidable cam, a roller on said mechanism against said cam, a bracket having a slot and a block movably mounted on said mechanism and slidable in said bracket to limit movement of said mechanism at right angles to the direction of operation by said cam member.

5. In a machine tool, in combination with means for rotating a work piece, a tool, a mechanism to move said tool toward and away from said work piece, means for operating said mechanism comprising a cam, motive means for said cam, controlling means for said motive means, a cam plate moving with said cam and having a pair of longitudinal slots merging into each other within respective ends of the cam plate, having an abrupt incline where the slots merge at one end of the plate, a control lever connected to said controlling means and comprising an arm with an extension adapted to ride in one slot as the cam member causes feeding motion of the tool, then to pass from this slot to the other slot as the feeding motion is completed and thereby operate said controlling means to reverse the movement of said cam, permitting return of the tool, said projection then riding in the other slot and traveling along said incline, and bringing said controlling means to a neutral position to stop the movement of the tool, said control lever being adapted to be operated manually to raise said projection away from said incline and again into the first mentioned slot for again starting the feeding movement of the tool.

6. In a machine tool, means for rotating the work, a tool carrier, a tool on said carrier, a cam engaging said tool carrier, determining the movement of said tool carrier to move the tool to and from the work, a member sliding with said cam having a pair of guide means extending in the direction of sliding of said member, power means to slide said cam, controlling means for said power means, and an operative connection to said controlling means comprising a part engaged successively by said guide means as the cam slides one way or the other, whereby the control means, as the part passes from one guide means to the other at the end of feeding movement, is operated to reverse said power means, and an engaging part on said member whereby the control means is set to stop said power means at the end of return from feeding movement.

7. In a machine tool, a substantially rectilinearly arranged series of chucks with their axes substantially parallel, a plurality of tool carriers arranged side by side along said axes, substantially rectilinearly arranged series of tools on the respective carriers, each tool of each series for a respective chuck, a steady rest member between two of said tool carriers, and means whereby said tool carriers are moved in planes substantially at right angles to the axes of said chucks.

8. In a machine tool, a substantially rectilinearly arranged series of chucks with their axes substantially parallel, a plurality of tool carriers arranged side by side along said axes, substantially rectilinearly arranged series of tools on the respective carriers, each tool of each series for a respective chuck, a steady rest member between two of said tool carriers, and means whereby said tool carriers are moved circularly about respective axes and said axes are moved in planes substantially at right angles to the axes of said chucks.

9. In a machine tool, a substantially rectilinearly arranged series of chucks with their axes substantially parallel, a plurality of tool carriers arranged side by side along said axes, substantially rectilinearly arranged series of tools on the respective carriers, each tool of each series for a respective chuck, bearing means on the sides of said tool carriers, and means whereby said tool carriers are moved in planes substantially at right angles to the axes of said chucks, said bearing means of adjacent tool carriers contacting to maintain the parallelism of the planes of movement of the tool carriers with a minimum of friction.

10. In a machine tool, a rotary work holder, a series of tool carriers along the axis of the work holder, a support with which said carriers are movable in planes at right angles to said axis, a cam having a movement across said planes, engaging and moving said support, a motive device for moving said cam, a control device for starting, stopping and reversing said motive device, operating means for the control device, and means movable in unison with said cam and actuating said operating means.

11. In a machine tool, a rotary work holder, a tool, a carrier for said tool having a movement in a plane at right angles to the axis of the work holder, a motive device causing said carrier movement, a control device starting, stopping and reversing said motive device, operating means for the control device, and means movable in unison with the carrier movement and actuating said operating means.

12. In a machine tool, a work holder rotating on a horizontal axis, an upper master member, a lower master member spaced horizontally from said work holders farther than said upper master member, a tool carrier supported on said master members, a movable support for the upper master member whereby said upper master member and said tool carrier may swing downward toward and upward away from said work holder axis, a tool carried by said carrier in position to be swung upward for feeding to a piece of work in said work holder, means to cause the upward swing, allowing the downward swing by gravity, and means to rotate said work holder and said master members in synchronism.

13. In a machine tool, a series of work holders rotating on parallel axes, a tool carrier swinging in a plane at right angles to said axes, a series of tools on said carrier, one for each work holder, said tools and said work holders being arranged closely along a single arc of swinging of said tool carrier, means for swinging said tool carrier, a steady rest member alongside said tool carrier, guiding the swinging thereof, and a stepped series of steady rests on said steady rest member, one for each piece of work held in a respective work holder.

14. In a machine tool, a series of rotary work holders on horizontal axes, a tool carrier to the rear of said work holders, a steady rest member alongside said tool carrier, means whereby said carrier is moved in a plane at right angles to said axes, said carrier being guided by said steady rest member, a stepped series of steady rests on said steady rest member, one for each work holder, closures for the respective steady rests locks for the respective closures, motive means at the rear of said steady rest member, and operative connections from the motive means to the respective locks, extending through said steady rest member.

15. In a multiple crank shaft lathe for cutting a series of crank pins simultaneously on a series of crank shafts, the combination of a series of chucks arranged in a desired line to support and rotate a series of crank shafts in said line with each other, a series of tool holders arranged in a series in a right angle plane to the crank shafts to be cut, and a series of tools on each tool holder arranged in a like line with the series of chucks, and means for imparting orbital movement to the tool holders.

16. In a multiple crank shaft lathe for cutting a series of crank pins simultaneously on a series of crank shafts, the combination of a series of chucks arranged in a desired line to support and rotate a series of crank shafts in said line with each other, a series of tool holders arranged in a series in a right angle plane to the crank shafts to be cut, a series of tools on each tool holder arranged in a like line with the series of chucks, means for imparting orbital movement to the tool holders, and means for effecting a relative bodily movement of the chucks as a unit and the tool holders as a unit.

17. In a multiple crank shaft lathe, for turning a plurality of crank pins on each one of a plurality of crank shafts simultaneously, a work support, tool supports, one for each crank pin on a shaft, a plurality of work holders rotatable on parallel axes on said work support, one for each shaft, a plurality of tools on each tool support, at least one for each work holder, said supports being relatively movable along a desired line in a plane at right angles to the work holder axes, and the tools being arranged on the tool supports for relative approach of the tools and the respective work holders in the general direction of said line of relative movement along said plane, and means carrying the tool supports and operatively connected to the work holders, imparting orbital movements to the tool supports along said plane in synchronism with the rotations of the work holders.

18. In a multiple crank shaft lathe for turning crank pins on a plurality of crank shafts simultaneously, a work support and a tool support, a plurality of work holders rotatable on parallel axes on said work support, a plurality of tools on said tool support, one for each work holder, means imparting an orbital movement to said tool support in a plane at right angles to the work holder axes, comprising a part with a pivotal connection to the tool support, on which said tool support also has a swinging movement in said plane, said work holders and the respective tools being arranged so as not to be displaced materially along said plane from a single arc of swinging movement of said tool support, and the tools being arranged on the tool support for relative approach of the tools and the respective work holders in the general direction of said arc of swinging along said plane.

WILLIAM F. GROENE.